United States Patent [19]

Kline et al.

[11] Patent Number: 4,526,528

[45] Date of Patent: Jul. 2, 1985

[54] APPARATUS FOR FORMING A CO-EXTRUSION FROM EXTRUDED STRIPS

[75] Inventors: John W. Kline, Uniontown; Donald W. Ward, Silver Lake, both of Ohio

[73] Assignee: The Goodyear Tire & Rubber Company, Akron, Ohio

[21] Appl. No.: 625,644

[22] Filed: Jun. 28, 1984

[51] Int. Cl.³ ............................ B29D 7/02; B29F 3/04
[52] U.S. Cl. ................................. 425/133.5; 264/171; 425/190; 425/376 B
[58] Field of Search ................. 425/133.5, 130, 131.1, 425/190, 376 B; 264/171

[56] References Cited

U.S. PATENT DOCUMENTS

| 1,603,812 | 10/1926 | Stein | 425/131.1 |
| 2,382,177 | 8/1945 | Schanz | 425/131.1 |
| 2,686,335 | 8/1954 | Gross | 425/131.1 |
| 2,892,212 | 6/1959 | Rhodes | 18/12 |
| 3,060,512 | 10/1962 | Martin et al. | 18/48 |
| 3,142,091 | 7/1964 | Curtiss | 18/12 |
| 3,871,810 | 3/1975 | Geyer | 425/374 |
| 3,956,056 | 5/1976 | Boguslawski et al. | 156/500 |
| 4,299,789 | 11/1981 | Giesbrecht | 264/176 R |
| 4,413,973 | 11/1983 | Peters | 425/376 B |

Primary Examiner—Willard E. Hoag

Attorney, Agent, or Firm—Frederick K. Lacher; T. P. Lewandowski

[57] ABSTRACT

An apparatus (10) wherein extruded strips (98,116) of elastomeric material are fed separately over a cylindrical roller surface (20) at more than one angular position (126,128,130) relative to the roller (18) by a die head (12) to form predetermined cross-sectional areas of the co-extrusion (118). The channels (26,28,36,38) in the die head guide plate (32) connecting the extruders (14,16) and the orifices (30,40) at the roller surface (20) are provided by walls of a replaceable preformer insert (44) which are spaced from the walls of an opening (42) in the guide plate (32). Different sizes and configurations of the channels (26,28,36,38) can be obtained using different preformer inserts (44). The grooves (80,88,90,114,132,134,138,151,152,154) which guide the strips (98,116) of elastomeric material applied to the roller surface (20) are in replaceable finish dies (66,68) mounted in a slot (70) in the cylindrical surface (22) of the die head (12) so that the various laminations and configurations required can be obtained by inserting the desired finish dies (66,68). Different finish dies (66,68) have grooves (80,88,90,114,132,134,138,151,152,154) at different positions to provide the desired overlapping of the applied strips (98,116).

17 Claims, 15 Drawing Figures

APPARATUS FOR FORMING A CO-EXTRUSION FROM EXTRUDED STRIPS

This invention relates generally to the forming of a co-extrusion of elastomeric material containing more than one compound on a roller die. This is desirable for tire treads where different compounds are used for different parts such as the cap and edges. Use of a roller die decreases the temperature of the extruded material and increases the dimensional stability of the co-extrusion.

Heretofore an apparatus has been proposed in which strips of different compounds are extruded from multiple extruders through separate orifices onto the roller at predetermined positions over the roller surface. The shape of the strips have been controlled by guides in the die head surface so that the split lines between strips and the final cross-sectional shape of the co-extrusion are precisely formed. This method and apparatus is shown and described in copending U.S. patent application Ser. No. 518,736, filed July 29, 1983. Although the method and apparatus described in the patent application has been effective, there has been a need for apparatus which is adaptable in a relatively short period of time to handle the many different elastomeric materials and extrude configuration needed in the manufacture of tires and tire components.

The present invention is directed to a multiple orifice roller die extrusion apparatus having a guide plate with a replaceable preformer insert for providing the desired flow of elastomeric material from the die head passageways to the orifices at the roller surface. Also the die head has replaceable finish dies with grooves for guiding the strips of elastomeric material applied to the surface of the roller. By using different finish dies it is possible to obtain a large number of cross-sectional shapes of the co-extrusion produced by the apparatus. In addition, the guiding grooves in adjacent finish dies are positioned to provide the underlying and overlapping of the edges of one strip by a second strip.

In accordance with one aspect of the invention there is provided a multiple orifice roller die extrusion apparatus for combining extrudable strips of elastomeric materials into a formed co-extrusion, the apparatus having a roller with an axis circumvented by a roller surface and means for rotating the roller about the axis, comprising die head means positioned adjacent to and having a generally cylindrical surface conforming to the roller surface, a first orifice and a second orifice in the die head means at spaced-apart positions, the first orifice being located for applying at least a first strip of elastomeric material over the roller surface, the second orifice being located for applying at least a second strip of elastomeric material over the roller surface at the spaced-apart positions, the die head means including at least one slot in said cylindrical surface, a first finish die replaceably mounted in the slot, the finish die having a first grooved surface for guiding the elastomeric material of at least the first strip or the second strip after application over the roller surface to form a single co-extrusion of the two strips.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but two of the various ways in which the principles of the invention may be employed.

Figure 1:
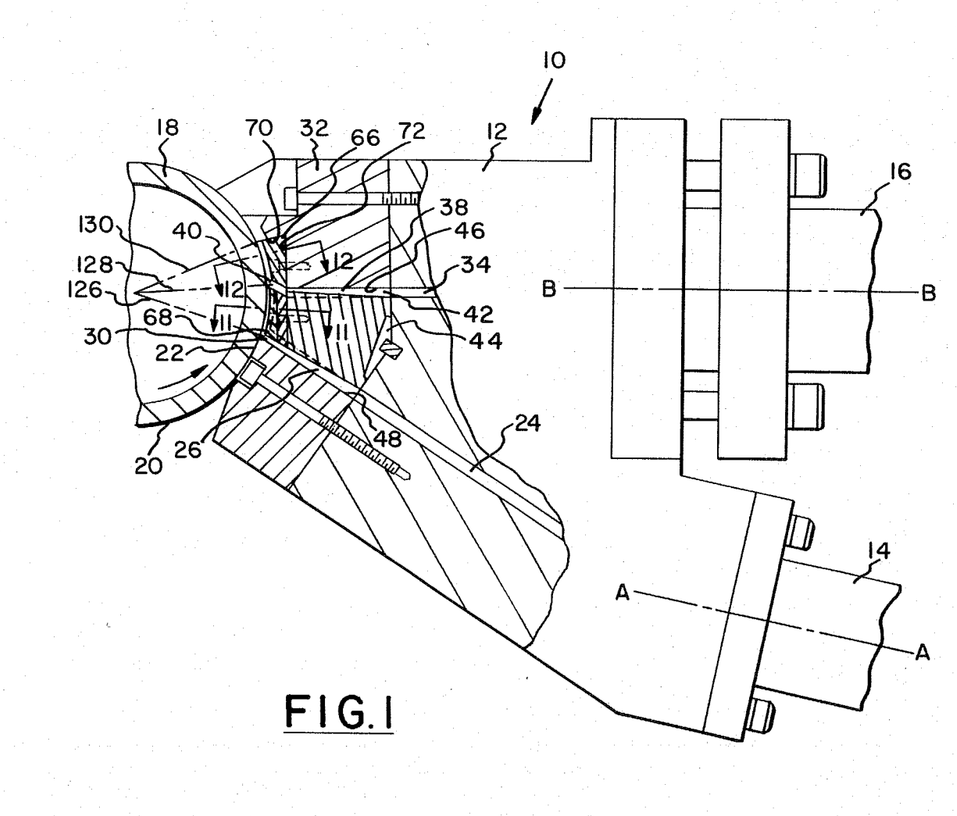
FIG. 1 is an enlarged fragmentary side view showing the die head and the roller die partially in section and taken along the plane at line 1—1 in FIG. 2.

Referring to FIG. 1, a multiple orifice roller die extrusion apparatus 10 is shown having a die head 12 connected to a first pressure means such as first extruder 14 and to a second pressure means such as second extruder 16 which is positioned over the first extruder. The first extruder 14 is of a type having a screw rotatable about an axis A—A and the second extruder 16 is of a similar type having a screw rotatable about an axis B—B. As shown in FIG. 1, the first extruder 14 and second extruder 16 may be positioned with the axes A—A and B—B at an acute angle to facilitate the feeding of extrudate from both extruders into the die head 12.

A roller 18 having a generally cylindrical roller surface 20 is mounted for rotation about an axis on a frame support (not shown) which is slidable toward and away from a generally cylindrical surface 22 of the die head 12 conforming to the roller surface.

Figure 2:
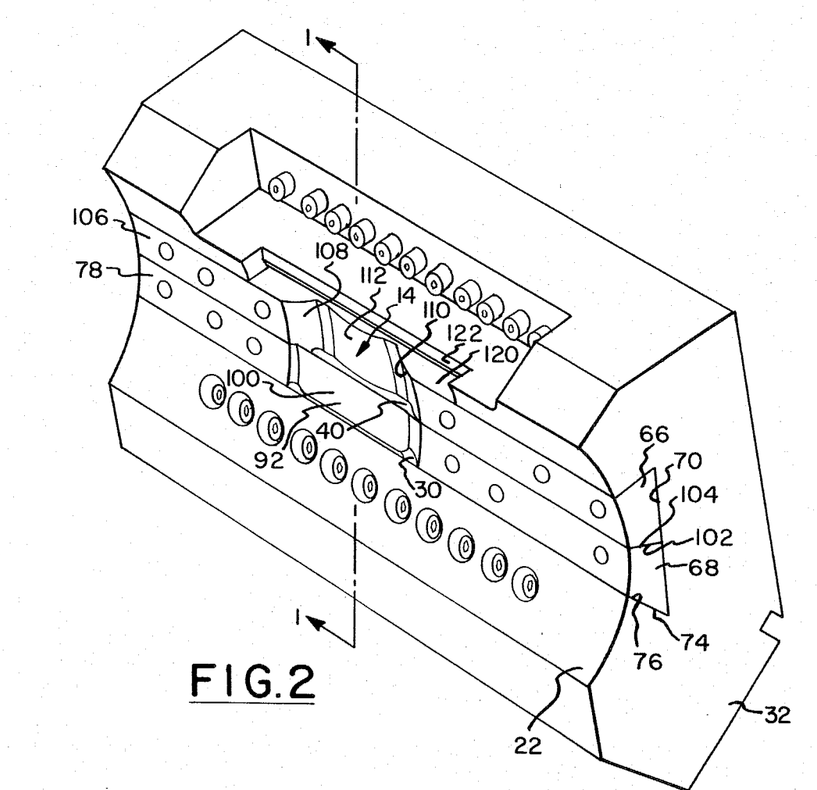
FIG. 2 is a perspective view of the guide plate showing the inner face and the replaceable finish dies.
Figure 3:
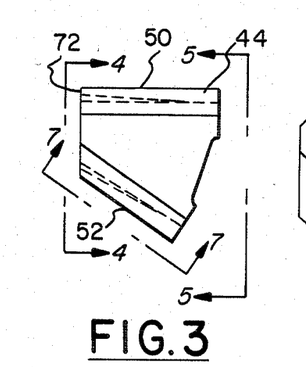
FIG. 3 is an end elevation of the preformer insert shown in FIG. 1.
Figure 4:
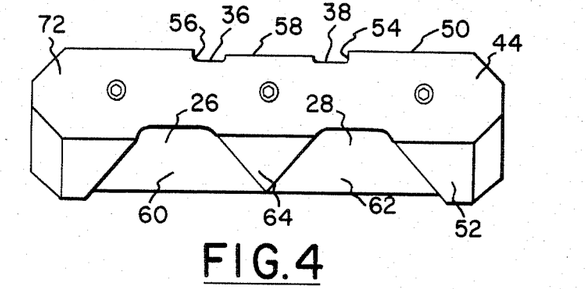
FIG. 4 is a front perspective view of the preformer insert taken along the line 4—4 of FIG. 3.
Figure 5:
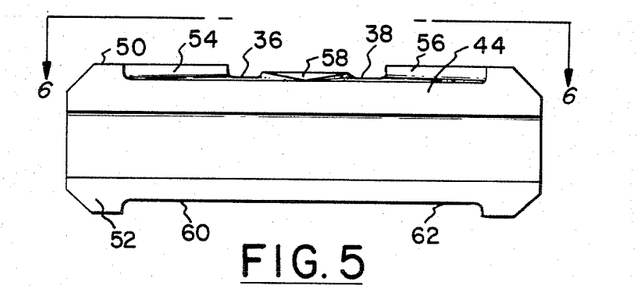
FIG. 5 is a rear elevation of the preformer insert taken along the line 5—5 in FIG. 3.
Figure 6:
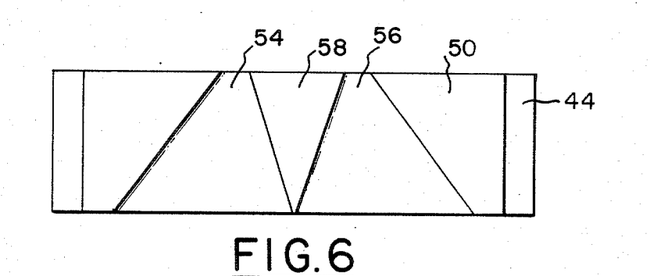
FIG. 6 is a top surface view of the preformer insert taken along the line 6—6 in FIG. 5.

A first die passageway 24 in the die head 12 extends from the first extruder 14 through channels 26 and 28 to a first orifice 30 in a circumferentially grooved body such as guide plate 32 having guide means at the cylindrical surface 22 of the die head. A second die passageway 34 in the die head 12 extends from the second extruder 16 through channels 36 and 38 to a second orifice 40 in the guide plate 32 as shown in FIGS. 1 and 2. The second orifice 40 is spaced angularly downstream from the first orifice 30.

As shown by the arrow in FIG. 1, the roller 18 may be driven in a counterclockwise direction. Suitable power means such as an electric motor and speed control means well known to those skilled in the art may also be provided. Below the roller 18 a take-away belt (not shown) may be positioned for moving the formed co-extrusion away from the apparatus 10.

Referring to FIG. 1, the guide plate 32 has an opening 42 for receiving a preformer insert 44, shown in greater detail in FIGS. 3 through 7. The guide plate 32 has a wall with a substantially flat upper surface 46 in the opening 42 which is in position for alignment with the second passageway 34 of the die head 12, shown in FIG. 1. The guide plate 32 also has a wall with a substantially flat lower surface 48 which is in position for alignment with the first die passageway 24 of the die head 12 shown in FIG. 1.

Referring to FIGS. 1 and 3 through 6, the preformer insert 44 has a top mating surface 50 for closely fitting engagement with the upper surface 46 of the wall in the opening 42 in the guide plate 32. Referring to FIGS. 1 and 3 through 5 and 7, the preformer insert 44 has a bottom mating surface 52 for closely fitting engagement with the lower surface 48 of the wall in the opening 42 of the guide plate 32. In the top mating surface 50 of the preformer insert 44 are top recesses 54 and 56 tapering from a width corresponding to the width of the second die passageway 34 in the die head 12, shown in FIG. 1, to a reduced width. The recesses 54 and 56 may be bifurcated by a raised triangular top separator 58. When the preformer insert 44 is mounted in the guide plate 32 the upper surface 46 of the wall in the opening 42 encloses the top recesses 54 and 56 to provide the bifurcated upper channels 36 and 38 which are partially separated by the top separator 58.

As shown in FIGS. 1 and 3 through 5 and 7, the bottom mating surface 52 has bottom recesses 60 and 62 which are bifurcated and may be tapered and partially separated by a generally triangular raised bottom separator 64. When the preformer insert 44 is mounted in the guide plate 32 with the bottom mating surface 52 in closely fitting engagement with the lower surface 48 of the wall in the opening 42 of the guide plate there are provided bifurcated lower channels 26 and 28.

In some applications the top recesses 54 and 56 may be combined into a single recess with straight sides having a width corresponding to the width of the second die passageway 34. In a like manner, the bottom recesses 60 and 62 may be combined into a single recess with straight sides having a width corresponding to the width of the first die passageway 24.

Figure 7:
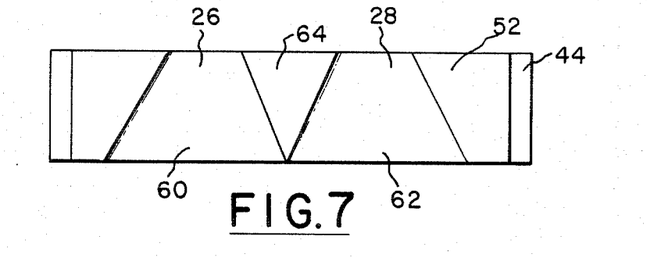
FIG. 7 is a bottom surface view of the preformer insert taken along the line 7—7 in FIG. 3.
Figure 8:
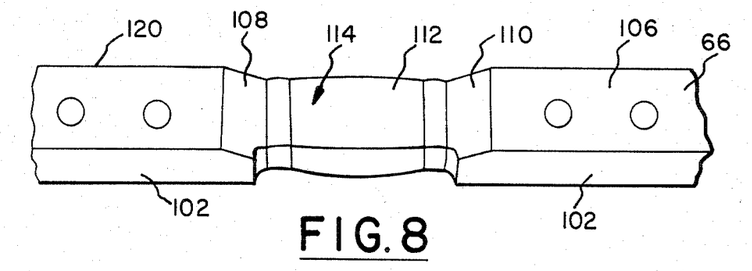
FIG. 8 is a fragmentary front view in perspective of the upper finish die shown FIGS. 1 and 2.
Figure 9:
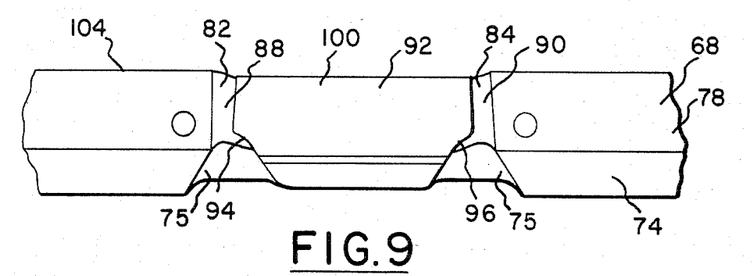
FIG. 9 is a fragmentary front view in perspective of the lower finish die shown in FIGS. 1 and 2.
Figure 10:
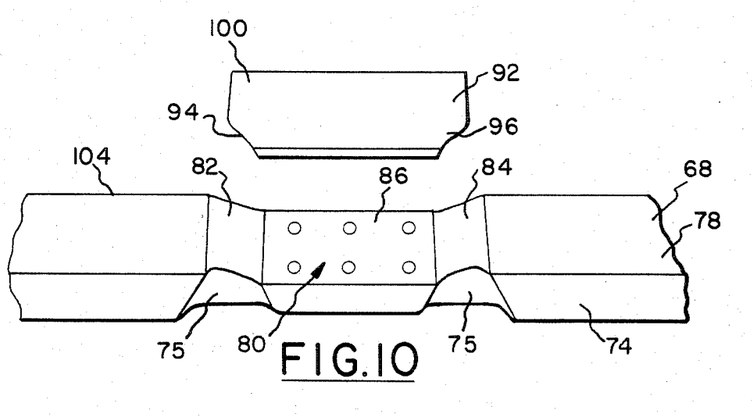
FIG. 10 is an exploded fragmentary front view of the lower finish die showing the removable forming plate.

Referring to FIGS. 1, 2, 7, 8, 9 and 10, an upper finish die 66 and a lower finish die 68 are replaceably mounted in a finish die slot 70 extending across the cylindrical surface 22 of the guide plate 32. The finish dies 66 and 68 cover a front end surface 72 of the preformer insert 44. The lower finish die 68 has a lower edge 74 for abutting engagement with a lower wall surface 76 of the slot 70 in the guide plate 32. The lower edge 74 of the lower finish die 68 is indented to form with the lower wall surface of the slot 70 the first orifice 30. As shown in FIGS. 9 and 10, the indentations in the lower edge 74 are larger at ends 75 to conform with the channels 26 and 28 and shallow at the center portion to conform with the bottom separator 64 of the insert 44 as shown in FIG. 7.

Figure 11:
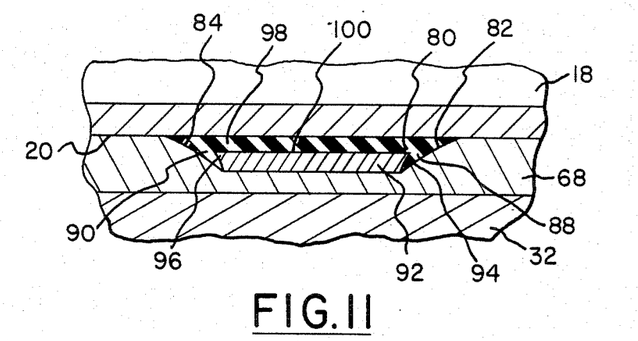
FIG. 11 is a fragmentary sectional view taken along the line 11—11 in FIG. 1 showing the first extruded strip as it would appear when guided by the lower finish die in the space between the lower finish die and the roller surface.

The lower finish die 68 has a cylindrical outer surface 78 which generally conforms with the cylindrical surface 22 of the guide plate 32. At the center of the guide plate 32 as shown in FIG. 10, the outer surface 78 of the lower finish die 68 is grooved and has a primary groove 80 formed by sloping surfaces 82 and 84 and connected by an intermediate flat surface 86. Secondary grooves 88 and 90 are provided between a plate member 92 positioned on the intermediate flat surface 86 and the sloping surfaces 82 and 84. The plate member 92 has edge surfaces 94 and 96 in spaced relation with the sloping surfaces 82 and 84, respectively, of the primary groove 80. As shown in FIG. 11, the plate member 92 may have a thickness less than the depth of the primary groove 80 to provide the desired cross section of a first strip 98 of elastomeric material which may be fed through the first orifice 30 over the cylindrical roller surface 20 and guided by the sloping surfaces 82 and 84 of the primary groove and edge surfaces 94,96 and plate surface 100.

The plate member 92 may be an integral part of the lower finish die 68 or may be replaceably fastened to the die so that when different cross sections of the first strip 98 are desired they may be obtained by replacing the plate member with plate members of other configurations.

Referring to FIGS. 1, 2 and 8, the upper finish die 66 has a lower edge 102 for abutting engagement with an upper edge 104 of the lower die 68. The lower edge 102 of the upper finish die 66 is indented to provide with the upper edge 104 of the lower die 68 the second orifice 40 conforming to the upper channels 36 and 38 in the preformer insert 44.

Figure 12:
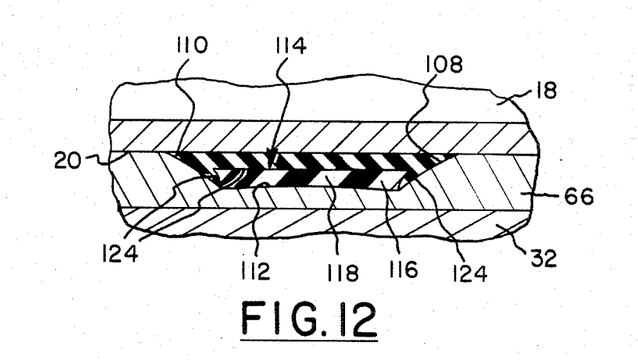
FIG. 12 is a sectional view like FIG. 11 taken along the line 12—12 in FIG. 1 showing the formed co-extrusion made up of the first extruded strip and the second extruded strip as it would appear when guided by the upper finish die in the space between the lower finish die and the roller surface.

The upper finish die 66 has a cylindrical outer surface 106 which conforms to the cylindrical surface 22 of the guide plate 32. The outer surface 106 is also grooved and has sloping surfaces 108 and 110 connected by an intermediate surface 112 forming an upper groove 114 for guiding a second strip 116 of elastomeric material fed through the second orifice 40 over the cylindrical roller surface 20 and onto the first strip 98 providing a cross section of a co-extrusion 118 which may be in the form of a tire tread as shown in FIG. 12.

Figure 13:
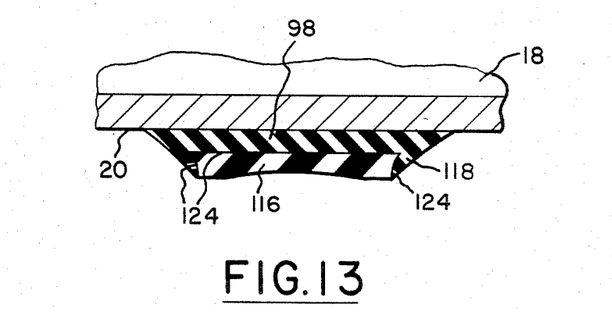
FIG. 13 is a view like FIGS. 11 and 12 showing the formed co-extrusion as it would appear on the roller surface after leaving the guide plate.

The upper groove 114 in the outer surface 106 of the upper finish die 66 extends to an upper edge 120 of the upper finish die where the guide plate 32 has an opening 122 through which the co-extrusion 118 may be carried on the roller surface 20 as shown in FIG. 13. After leaving the upper groove 114 in the outer surface 106 of the upper finish die 66, the co-extrusion 118 will expand to the configuration shown in FIG. 13. With the apparatus of this guide plate 32 mounted on a die head such as the die head 12 shown in FIG. 1, the first strip 98 and second strip 116 of elastomeric material, such as rubber, are guided sufficiently to maintain split lines 124 between the strips and limit and contain the expansion of the co-extrusion 118.

In this embodiment, which is for a tire tread, the width of the primary groove 80 of the lower finish die 68 is approximately 2 inches (5.08 cm) for guiding the first strip 98 and the upper groove 114 of the upper finish die 66 has a width of approximately 2 inches (5.08 cm) for guiding the co-extrusion 118 including the first strip and the second strip 116 of elastomeric material. It is understood that the guide plate 32 may be heated or cooled with a fluid conducted by conduits through the plate. The guide plate 32 may be fastened to a die body such as die head 12, shown in FIG. 1, by threaded fasteners such as studs and the finish dies 66 and 68 may also be fastened to the guide plate by threaded fasteners. The preformer insert 44 may be a replaceable part and may be fastened to the guide plate 32 by threaded fasteners. With this construction, preformer inserts 44 having different shaped recesses 54, 56, 60 and 62 may be used with finish dies 66 and 68 having grooves 80, 88, 90 and 114 of desired configurations so as to provide the size and cross section of the first strip 98 and second strip 116 making up the co-extrusion 118. Accordingly the apparatus of this invention is adaptable for making co-extrusions 118 of a number of different shapes and sizes utilizing the same guide plate 32.

In operation different compounds of elastomeric material suitable for tire treads may be fed into the extrusion apparatus 10. As shown in FIGS. 1 and 11–13, a compound suitable for the tread edges may be fed into the first extruder 14 and a compound suitable for the tread cap may be fed into the second extruder 16.

The extrudate from the first extruder 14 passes through the first die passageway 24 and through the first orifice 30 to form the first strip 98 at a first predetermined angular position 126 over the cylindrical roller surface 20. The first strip 98 is guided in the primary groove 80 and secondary grooves 88 and 90 of the lower finish die 68 as it is moved on the cylindrical roller surface 20 to a second predetermined angular position 128.

The extrudate from the second extruder 16 is fed through the second die passageway 34 and into the second orifice 40 over the cylindrical roller surface 20 at the second predetermined angular position 128 to provide the second strip 116 to form the co-extrusion 118.

The roller 18 is rotated at a speed to accommodate the rate of application of the first strip 98 over the roller 18 which results from the turning of the screw in the first extruder 14. The screw in the second extruder 16 is rotated at a speed to provide a rate of application of the second strip 116 over the roller 18 which conforms with the speed of rotation of the roller. Preferably the second strip 116 is applied over the roller 18 at the same rate of application as the rate of application of the first strip 98 over the roller.

Between the second predetermined angular position 128 and an exit end of the guide plate 32 the co-extrusion 118 is carried by the roller 18 to a third predetermined angular position 130. As described heretofore, the co-extrusion 118 made up of the first strip 98 and the second strip 116 is guided by the surfaces of the upper groove 114 sufficiently to maintain the split lines 124 between the strips and limit the expansion as shown in FIG. 12.

Figure 14:
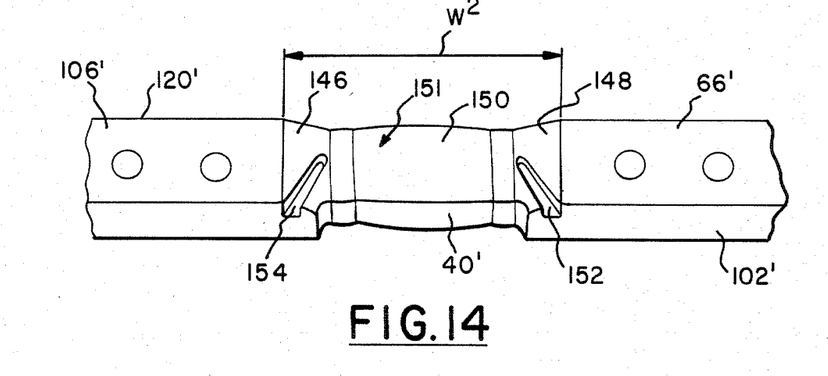
FIG. 14 is a view like FIG. 8 showing a modified upper finish die.
Figure 15:
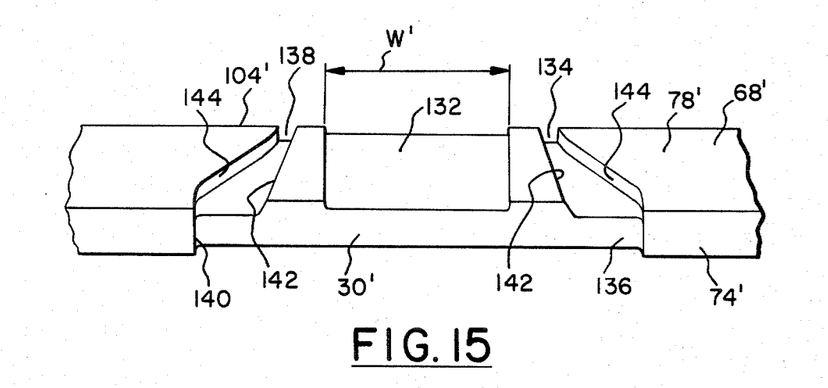
FIG. 15 is a view like FIG. 9 showing a modified lower finish die for use with the upper finish die of FIG. 14.

Referring to FIGS. 14 and 15, a modification is shown in which an upper finish die 66' and a lower finish die 68' are provided for replaceably mounting in the finish die slot 70 of the guide plate 32. The finish dies 66' and 68' cover the front end surface 72 of the preformer insert 44.

Referring to FIG. 15, the lower finish die 68' has a lower edge 74' for abutting engagement with the lower wall surface 76 of the slot 70 in the guide plate 32. The lower edge 74' of the lower finish die 68' is indented to form with the lower wall surface 76 of the slot 70 a first orifice 30'.

The lower finish die 68' has a cylindrical outer surface 78' which conforms with the cylindrical surface 22 of the guide plate 32. At the center of the guide plate 32 the outer surface 78' of the lower finish die 68' is grooved and preferably has a center groove 132 having a width $W^1$ less than the desired width $W^2$, shown in FIG. 14, of the co-extrusion 118 as it leaves the upper finish die 66'. Spaced from a first edge of the center groove 132 is a first side groove 134 for laying a first strip of elastomeric material from the first orifice 30' on the roller surface 20 at a first edge 136 of the first orifice. A second side groove 138 may be spaced from a second edge 140 of the first orifice 30' for laying a second strip of elastomeric material from the first orifice on the roller surface 20. Axially inner walls 142 and outer walls 144 of the first said groove 34 and second side groove 138 may be inclined toward the center groove 132 to urge the material in the first and second side grooves 134 and 138 toward the center of the guide plate 32 as the roller 18 is rotated.

Referring to FIG. 14, the upper finish die 66' has a lower edge 102' for abutting engagement with an upper edge 104' of the lower finish die 68'. The lower edge 102' of the upper finish die 66' is indented to provide with the upper edge 104' of the lower finish die 68' a second orifice 40'. The upper finish die 66' has a cylindrical outer surface 106' which conforms to the cylindrical surface 22 of the guide plate 32. The outer surface 106' is also grooved and has sloping surfaces 146 and 148 connected by an intermediate surface 150 forming an upper groove 151 for guiding a second strip of elastomeric material fed through the second orifice 40' over the cylindrical roller surface 20 and onto the first strip.

The upper finish die 66' may also have a first upper side groove 152 in the sloping surface 148 which may be connected with the side groove 134 at the lower edge 102' and terminate in the sloping surface 148 at a position between the lower edge and an upper edge 120' of the upper finish die 66'. A second upper side groove 154 in the sloping surface 146 in the upper finish die 66' may be connected to the second side groove 138 at the lower edge 102' and terminate in the sloping surface 146 at a position between the lower edge and the upper edge 120' of the upper finish die.

In operation, the material in the first and second side grooves 134 and 138 of the lower finish die 68' is guided by the first and second upper side grooves 152 and 154 into positions along the edge of the upper groove 151 and in an overlapping relationship to the edges of the second strip to provide a cross section of the co-extrusion 118 such as that shown in FIG. 13.

With the embodiments of FIGS. 1–13 and FIGS. 14 and 15, it has been found that co-extrusions 118 having a large number of cross-sectional shapes can be produced by using different replaceable finish dies. It has also been found that improved results have been obtained in underlying and overlapping of the edges of one strip by a second strip of the co-extrusion 118. This has been done while maintaining the split lines 124 between the strips and containing the expansion of the co-extrusion 118.

The multiple orifice roller die extrusion apparatus 10 shown and described is for producing one co-extrusion 118; however, it is evident that the die passageways 24 and 31 from the extruders 14 and 16 may also be in communication with channels leading to orifices in another guide plate positioned next to the guide plate 32 on the die head 12 for simultaneously producing a second co-extrusion.

While certain representative embodiments and details have been shown for the purpose of illustrating the invention, it will be apparent to those skilled in the art that various changes and modifications may be made therein without departing from the spirit or scope of the invention.

What is claimed is:

1. A multiple orifice roller die extrusion apparatus for combining extrudable strips of elastomeric materials into a formed co-extrusion, said apparatus having a roller with an axis circumvented by a roller surface and means for rotating said roller about said axis, comprising die head means positioned adjacent to and having a generally cylindrical surface conforming to said roller surface, a first orifice and a second orifice in said die head means at spaced-apart positions, said first orifice being located for applying at least a first strip of elastomeric material over said roller surface, said second orifice being located for applying at least a second strip of elastomeric material over said roller surface at said spaced-apart positions, said die head means including at least a first finish die replaceably mounted on said cylindrical surface, said first finish die having an indented edge forming said first orifice with a wall surface of said die head means and said first finish die having a first grooved surface for guiding the elastomeric material of at least said first strip after application over said roller surface to form a single co-extrusion of said first strip and said second strip.

2. Apparatus of claim 1 wherein a second finish die is replaceably mounted on said cylindrical surface next to said first finish die, said second finish die having an indented edge forming said second orifice with an edge of said first finish die and said second finish die having a second grooved surface for guiding said second strip after application over said roller surface.

3. Apparatus of claim 2 wherein said first orifice is positioned between said first finish die and said die head means and said second orifice is positioned between said first finish die and said second finish die.

4. Apparatus of claim 1 wherein said first grooved surface includes a primary groove and a plate member positioned in said groove providing secondary grooves between the surfaces of said primary groove and said plate member for guiding said first strip of elastomeric material after applications over said roller surface.

5. Apparatus of claim 2 wherein said first finish die has a center groove, a first side groove spaced from a first edge of said center groove, a second side groove spaced from a second edge of said center groove, said second finish die having an intermediate surface and sloping surfaces forming an upper groove, a first upper side groove in one of said sloping surfaces and a second upper side groove in the other of said sloping surfaces, said first upper side groove being positioned for connection with said first side groove of said first finish die, said second upper side groove being positioned for connection with said second side groove of said first finish die for guiding the material in said first side groove and said second side groove into positions along the edge of said upper groove and in overlapping relation with the edges of said second strip.

6. Apparatus of claim 5 wherein said center groove of said first finish die has a width not greater than the width of said upper groove of said second finish die.

7. Apparatus of claim 5 wherein said first side groove and said second side groove have axially inner and outer walls inclined toward said center groove to guide the elastomeric material in said first side groove and said second side groove toward said center groove of said first finish die and said upper groove of said second finish die.

8. Apparatus of claim 1 wherein said die head means includes passageways for conveying said elastomeric material, a removable preformer insert, said die head means having an opening with walls for receiving said removable preformer insert in closely fitting mating engagement with mating surfaces of said insert, said preformer insert having recesses in said surfaces which are enclosed by said walls of said opening in said die head means to provide channels in communication between said passageways and said first and second orifices.

9. Apparatus of claim 8 wherein said die head means includes a die head body and a replaceable guide plate for attachment to said die head body, said guide plate containing said first and second orifices and having said cylindrical surface of said die head means with at least one for mounting of at least one of said finish dies.

10. Apparatus of claim 9 wherein said die head body contains said passageways for conveying said elastomeric material to said guide plate and said replaceable guide plate has said opening of said die head means with said walls in said opening to provide said channels in communication between said passageways and said first and second orifices.

11. Apparatus of claim 8 wherein said walls of said opening and said mating surfaces are substantially flat.

12. Apparatus of claim 11 wherein said channels include at least one of said recesses in one of said mating surfaces of said preformer insert in communication with said first orifice and one of said passageways and at least one of said recesses in another of said mating surfaces of said insert in communication with said second orifice and another of said passageways.

13. Apparatus of claim 12 wherein one of said recesses in at least one of said mating surfaces of said insert is bifurcated providing a single channel in communication with one of said passageways and two channels in communication with one of said orifices.

14. Apparatus of claim 1 wherein said die head means includes at least one axially extending slot in said cylindrical surface, said first finish die is replaceably mounted in said slot and said wall surface in said die head means is a wall surface of said slot.

15. Apparatus of claim 14 wherein a second finish die is replaceably mounted in said slot next to said first finish die, said second finish die having an indented edge forming said second orifice with an edge of said first finish die and said second finish die having a second grooved surface for guiding said second strip after application over said roller surface.

16. A multiple orifice roller die extrusion apparatus for combining extrudable strips of elastomeric materials into a formed co-extrusion, said apparatus having a roller with an axis circumvented by a roller surface and means for rotating said roller about said axis, comprising die head means positioned adjacent to and having a generally cylindrical surface conforming to said roller surface, a first orifice and a second orifice in said die head means at spaced-apart positions, said first orifice being located for applying at least a first strip of elastomeric material over said roller surface, said second orifice being located for applying at least a second strip of elastomeric material over said roller surface at said spaced-apart positions, said cylindrical surface of said die head means having a grooved surface for guiding the elastomeric material of at least said first strip after application over said roller surface and said die head means including passageways for conveying said elastomeric material to said first orifice and said second orifice, a removable preformer insert, an opening in said die head means having walls for receiving said removable preformer insert in closely fitting mating engagement with mating surfaces of said preformer insert, said preformer insert having recesses in said surfaces which are enclosed by said walls of said openings in said die head means to provide channels in communications between said passageways and said first and second orifices.

17. A multiple orifice roller die extrusion apparatus for combining extrudable strips of elastomeric materials into a formed co-extrusion, said apparatus having a roller with an axis circumvented by a roller surface and means for rotating said roller about said axis, comprising die head means positioned adjacent to and having a generally cylindrical surface conforming to said roller surface, a first orifice in said die head means, a second orifice in said die head means downstream of said first orifice, said first orifice being located for applying at least a first strip of elastomeric material over said roller surface, said second orifice being located for applying at least a second strip of elastomeric material over said roller surface, a center groove in said cylindrical surface between said first orifice and said second orifice, a first side groove in said cylindrical surface spaced from a first edge of said center groove, a second side groove in said cylindrical surface spaced from a second edge of said center groove, an intermediate surface and sloping surfaces forming an upper groove in said cylindrical surface downstream of said second orifice, a continuation of said first side groove in one of said sloping surfaces and a continuation of said second side groove in the other of said sloping surfaces for guiding the material in said first side groove and said second side groove into positions along the edges of said upper groove and in overlapping relation with the edges of said second strip.

* * * * *

UNITED STATES PATENT OFFICE
CERTIFICATE OF CORRECTION

Patent No. 4,526,528      Dated July 2, 1985

Inventor(s) John W. Kline and Donald W. Ward

It is certified that error appears in the above-identified patent and that said Letters Patent are hereby corrected as shown below:

Column 1, line 27, "extrude" should read --extrudate--.

Column 6, line 16, "first said groove 34" should read --first side groove 34--;

line 58, "underlying" should read --underlaying--.

Column 7, line 49, "applications" should read --application--.

Column 8, line 24, "one for mounting" should read --one slot for mounting--.

line 32, "Apparatus of claim 8" should read --Apparatus of claim 8 or 16--.

Signed and Sealed this

Fourteenth Day of January 1986

[SEAL]

Attest:

DONALD J. QUIGG

Attesting Officer      Commissioner of Patents and Trademarks